United States Patent [19]
Heron

[11] Patent Number: 4,818,207
[45] Date of Patent: Apr. 4, 1989

[54] CURSIVE LETTER DOUGH CUTTER

[76] Inventor: Helen L. Heron, 1085 Murrieta Ave., #212, Livermore, Calif. 94550

[21] Appl. No.: 174,159

[22] Filed: Mar. 28, 1988

[51] Int. Cl.$^4$ .............................................. A21C 11/10
[52] U.S. Cl. ...................................... 425/289; 30/315; 30/316; 249/103; 425/298; 426/503; D7/43
[58] Field of Search ............... 30/301, 302, 305, 315, 30/316, 329, 340, 349, 353; 249/103; 264/132; 425/289, 298, 306, 316; 426/503, 518; D7/43

[56] References Cited

U.S. PATENT DOCUMENTS

| | | | |
|---|---|---|---|
| 735,727 | 8/1903 | De Woody | 30/305 |
| 2,081,724 | 5/1937 | Abbott | 425/298 |
| 2,364,339 | 12/1944 | Becker | 30/340 |
| 3,526,163 | 9/1970 | Lowery | 425/306 |
| 3,531,863 | 10/1970 | Sandborn et al. | 30/316 |
| 4,327,489 | 5/1982 | Conrad | 425/298 |
| 4,424,601 | 1/1984 | Weber | 30/302 |
| 4,516,923 | 5/1985 | Lifshitz et al. | 425/289 |
| 4,606,716 | 8/1986 | McCaffrey | 425/289 |

FOREIGN PATENT DOCUMENTS 1072873 1/1960 Fed. Rep. of Germany ...... 425/182

*Primary Examiner*—Jay H. Woo
*Assistant Examiner*—C. Scott Bushey
*Attorney, Agent, or Firm*—Albert O. Cota

[57] ABSTRACT

A dough cutter which has a complete set of cursive alphabetic letters (22) raised on the top of individual cutter bodies (20) that attach together forming a continuous combination of letters. On the side of each body opposite the letters is an extended cutting blade (26) outwardly deployed from the body in the form of a border of the raised letter the same as on the top, except in mirror image. A method of attachment is employed, in three embodiments, each holding a number of bodies together forming a continuous combination of letters. When the cutter is pressed into baking dough, a continuous combination of letters is formed in infinite variations heretofore unachievable.

15 Claims, 6 Drawing Sheets

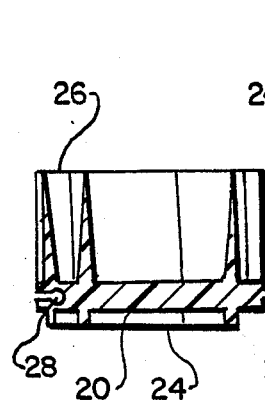
FIG.3.
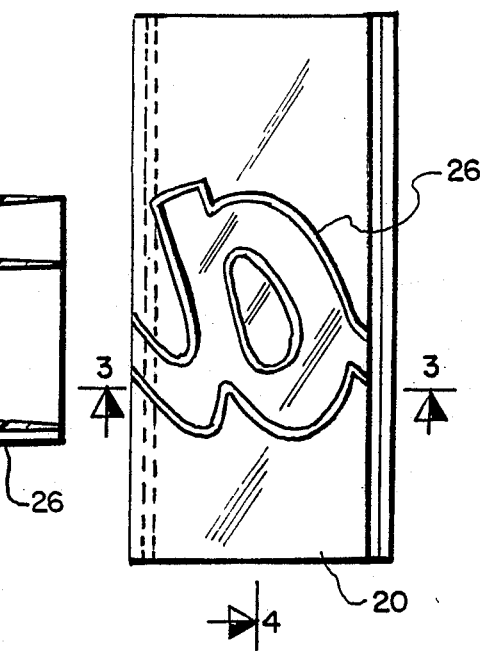
FIG.4.
FIG.5.
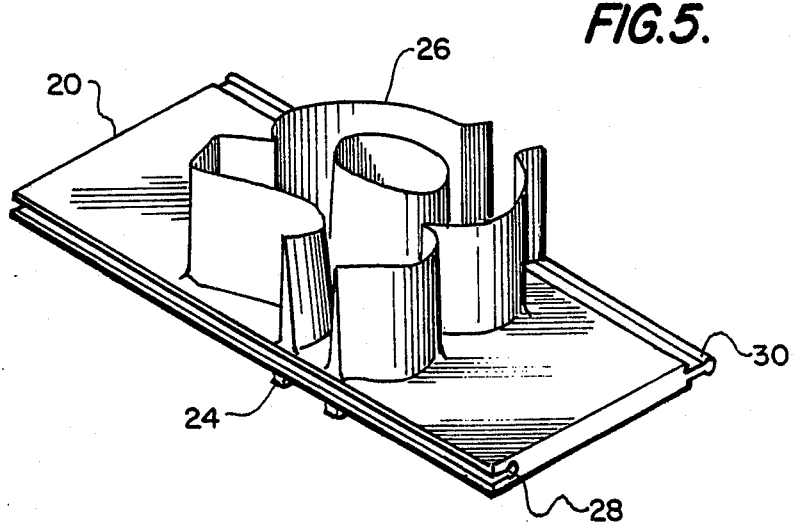
FIG.6.

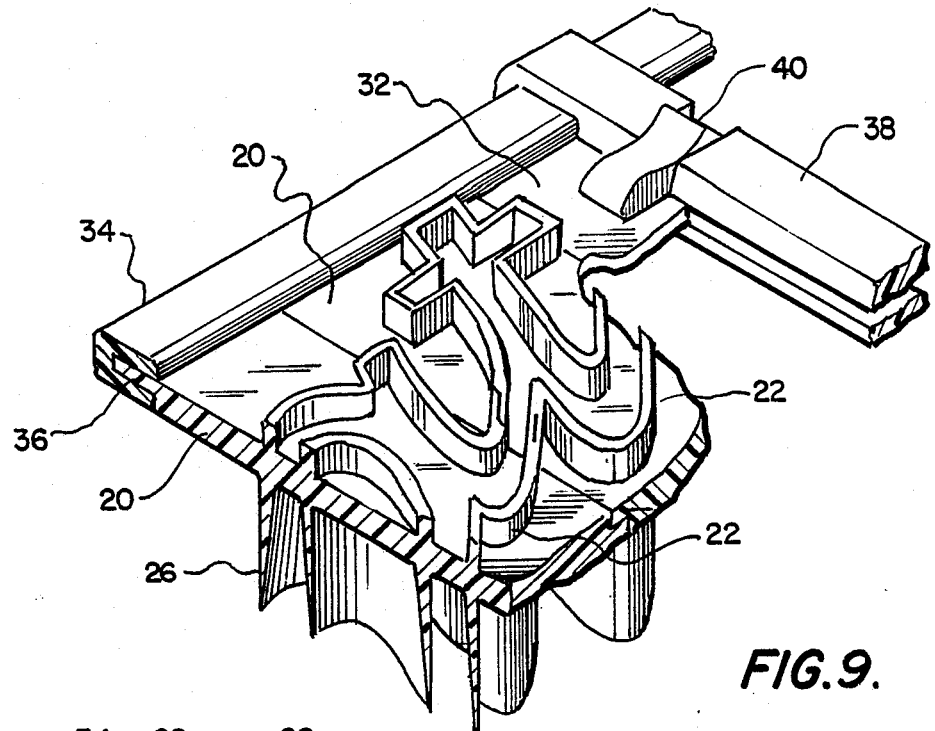
FIG.9.
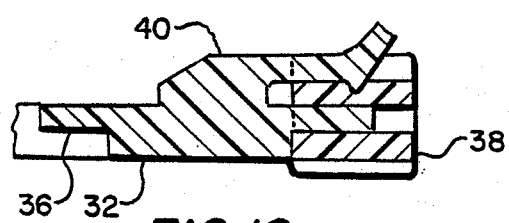
FIG.10.
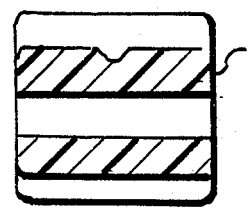
FIG.11.
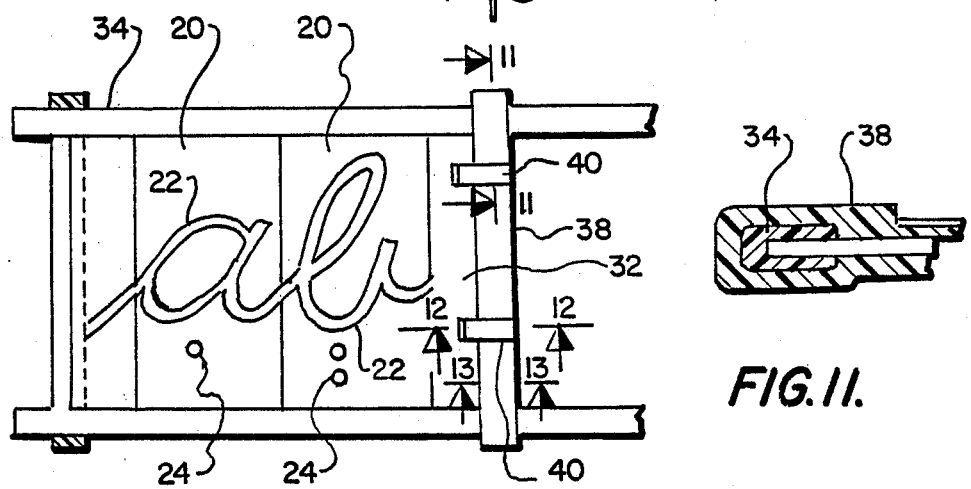
FIG.12.
FIG.13.

CURSIVE LETTER DOUGH CUTTER

TECHNICAL FIELD

The invention pertains generally to manual dough cutters, and more specifically to a cookie cutter having individual cursive letters attached together in a set forming a recognizable word.

BACKGROUND ART

Previously, dough cutters collectively have been in use in a variety of shapes and sizes. In most cases, the shape of a cookie cutter is related to a type of theme or a particular form of pastry. Some cutters are completely hollow, and others have a cutting blade on the bottom. While the shape of a cutter is not unique by itself, a combination of individual cutters connected side by side to form a recognizable word offers a cookie made therefrom novelty not heretofore achieved.

A search of the prior art failed to disclose any combination cutters that read on the claims of the instant invention, however, for background purposes and as indicative of the art to which this invention relates, the following patents are cited.

Riddle, in U.S. Pat. No. Des. 161,208, discloses a design using the alphabet in a dish set wherein each dish is formed into the shape of one of the letters of the alphabet. All of the shapes of the dishes are formed from upper case letters and the bottoms are flat with outwardly tapered sides. The shape of the sides would, by their very nature, exclude them from being used to cut out a resilient substance, such as dough, used in baking into an alphabet shape.

Conrad, in U.S. Pat. No. 4,327,489, issued May 4, 1982 teaches a dough cutter having a handle with an apparatus for limiting the movement of the cutter. On the cutting surface separate cutting elements are in side by side relationship and have depending cutting ribs. The cutters are removable and are retained on a single base. Although separate elements are taught, the relationship therebetween is to change the shape of the cut image, however, the connection therebetween has no particular relevance or purpose, such as forming a word pattern, as taught in the instant invention.

DISCLOSURE OF THE INVENTION

While the shape of a cookie is able to convey a message, or may have some particular meaning, usually this is limited to one mold or cutter for each separate form. Since much significance is placed on words that are spelled with individual letters, infinite variations may be formed by having a set of alphabetized cutters that are easily attached together to form a word. As a cookie made from dough must be rolled in the flat and cut on the periphery, letters in upper or lower case would not allow connection therebetween. It is, therefore, the primary object of the instant invention to fill a need previously not realized, allowing a word to be formed in cursive letters that may be attached together into a unitized form. This combination of letters creates an entirely novel pattern that may easily be changed into words having meaning to the user.

An important object of the invention allows the use of the dough cutter to form words from non-edible material that has structural integrity when baked for use as teaching aids in presenting cursive writing to students first receiving direction in this style of writing. These words formed by the invention in the permanent configuration add a dimension in teaching wherein the formed word may be viewed and even handled by the student.

Like many cookie cutters that have a shape that is representational of an occasion or holiday season, another object of the invention allows words to be used that are personally directed to the circumstance or situation in a serious or even a humorous manner furthering the utility of the invention.

Still another object of the invention, particularly in the preferred embodiment, is the ability to mass produce the individual cutters in a cost effective manner. Once the cost of the tooling is absorbed, the piece price of mass produced cutters is reasonable even when the entire alphabet is required, as manufacturing techniques such as injection molding is well known in the art and in common usage.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 3 is a cross-sectional view taken along lines 3—3 of FIG. 4.

FIG. 4 is a cross-sectional view taken along lines 4—4 of FIG. 4.

FIG. 5 is a plan view of the top of an individual cutter.

FIG. 6 is a partial isometric view of the preferred embodiment depicting the bottom of an individual cutter.

FIG. 9 is a partial isometric view of the second embodiment with the cutters placed together in the retaining frame, partially cut-away for clarity.

FIG. 10 is a plan view of the second embodiment, as in FIG. 9.

FIG. 11 is a cross-sectional view taken along lines 11—11 of FIG. 10.

FIG. 12 is a cross-sectional view taken along lines 12—12 of FIG. 10.

FIG. 13 is a cross-sectional view taken along lines 13—13 of FIG. 10.

BEST MODE FOR CARRYING OUT THE INVENTION

Figure 1:
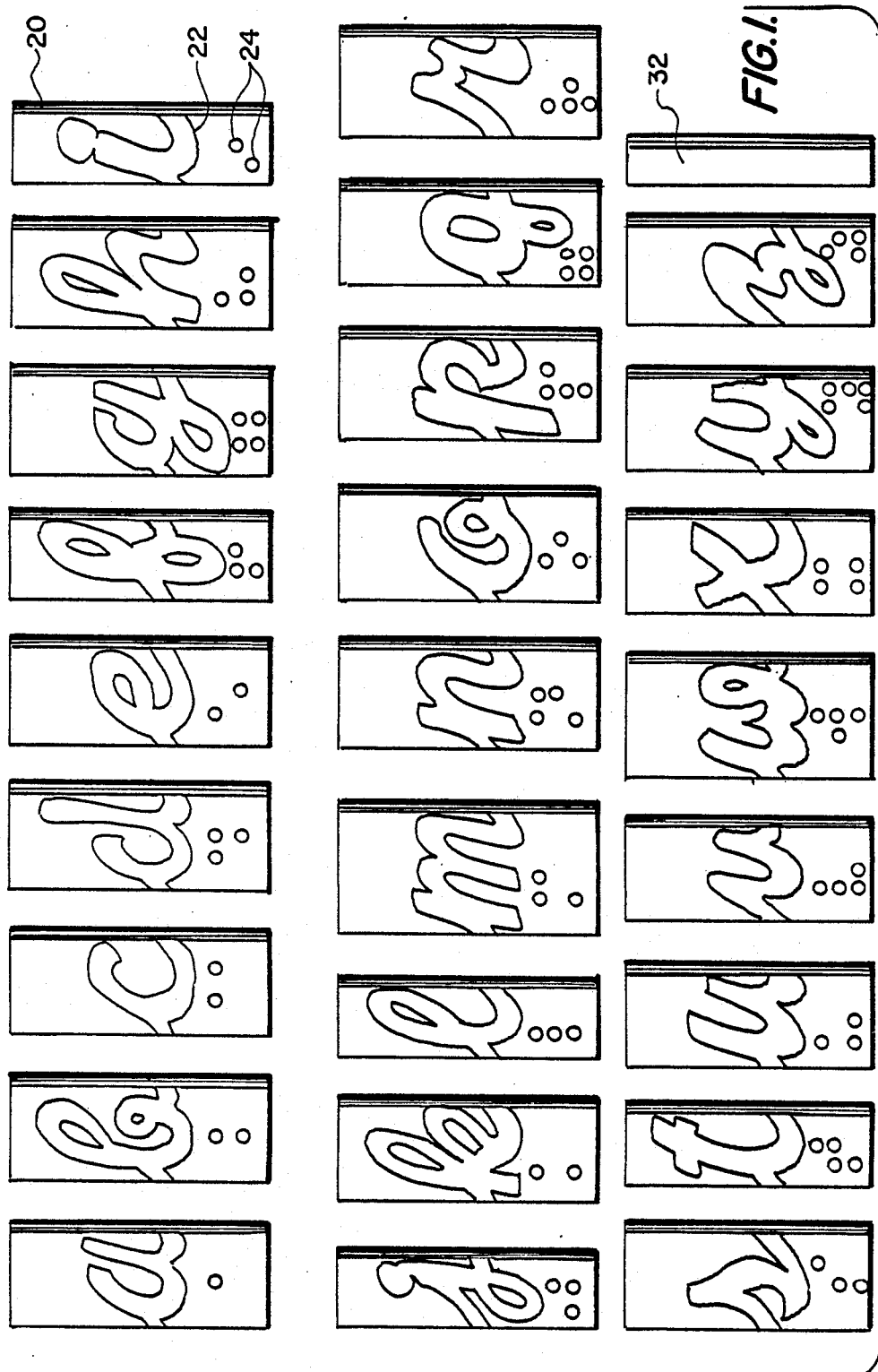
FIG. 1 is a plan view of the preferred embodiment illustrating the entire alphabet as viewed from the top of the body.

The best mode for carrying out the invention is presented in terms of a preferred, second and third embodiments. All three embodiments are primarily designed the same, except the method of attaching the individual cutters together.

The preferred embodiment, as shown in FIGS. 1 through 8 is comprised of a plurality of rectangular cutter bodies 20. These bodies have a top and bottom surface, an upper and lower edge and a first and second side. Each body 20 is made of any material suitable for the application, however, thermoplastic or metal is preferred. A thermoset plastic would also be suitable, however, cost restraints and manufacturing techniques may inhibit its desirability. Any number of plastic compositions may be utilized, such as cellulose, polycarbonate, polyester, polyethylene, polypropylene, polyvinylchloride, or the like. Metals, such as aluminum, ferrous compositions, or die cast zinc may also be used with equal ease.

The top surface of the body 20 contains a raised individual cursive alphabet letter 22 that is integrally formed. The width of the letter 22 completely fills the body 20 from the first to the second side allowing the letter to intercede with each other at the starting and ending interface. This matching of each end is accomplished by positioning the letter ends at the same distance from the lower edge of the body 20. The letters 22 may be outlined, as illustrated in FIGS. 3 through 7, on the outside edge, or may be filled solid with either, having a texturized surface on the raised portion, if desired, allowing the surface to have a different appearance or feel.

While not necessary for the function of the invention, a raised individual braille sign 24 corresponding to the individual cursive alphabet letter may be integrally positioned on the top surface preferably near the lower edge of the body 20. This mark allows the blind to identify the letter by touch or feel.

An extended cutting blade 26 is integrally located on the bottom surface of each body 20 and is in the same form as the raised alphabet letter 22 located on the top, except in mirror image. The blade 26 has a sharp flat edge at the end which allows the dough to be cleanly cut when the cutter is pressed into the flattened workpiece. These blades 26 outline the letter on each side, as illustrated in FIG. 6, with both ends open to allow the combination of letters to continue on each end when they are mated together.

In order to form a word, the bodies 20 are attached together in a removable manner such that the first side of one body is contiguous with the second side of the other. This attaching means consists of a groove 28 along the entire first side and a tongue 30 formed integrally on the other. The groove 28 is in keyhole shape with an enlarged radial end, shown best in FIG. 3. The tongue 30 is basically the same shape, except in reverse, having a bulb-like radial end. The tongue 30 is sufficiently smaller than the groove 28 to allow the two elements to slide together engaging them in a slip fit tight enough to hold the bodies 20 together even when a number of cutters are mated in unison to form a long word. Slight variations in fit may be accommodated by varying the size of either element or the addition of raised barbs or projections at the appropriate point.

Figure 2:
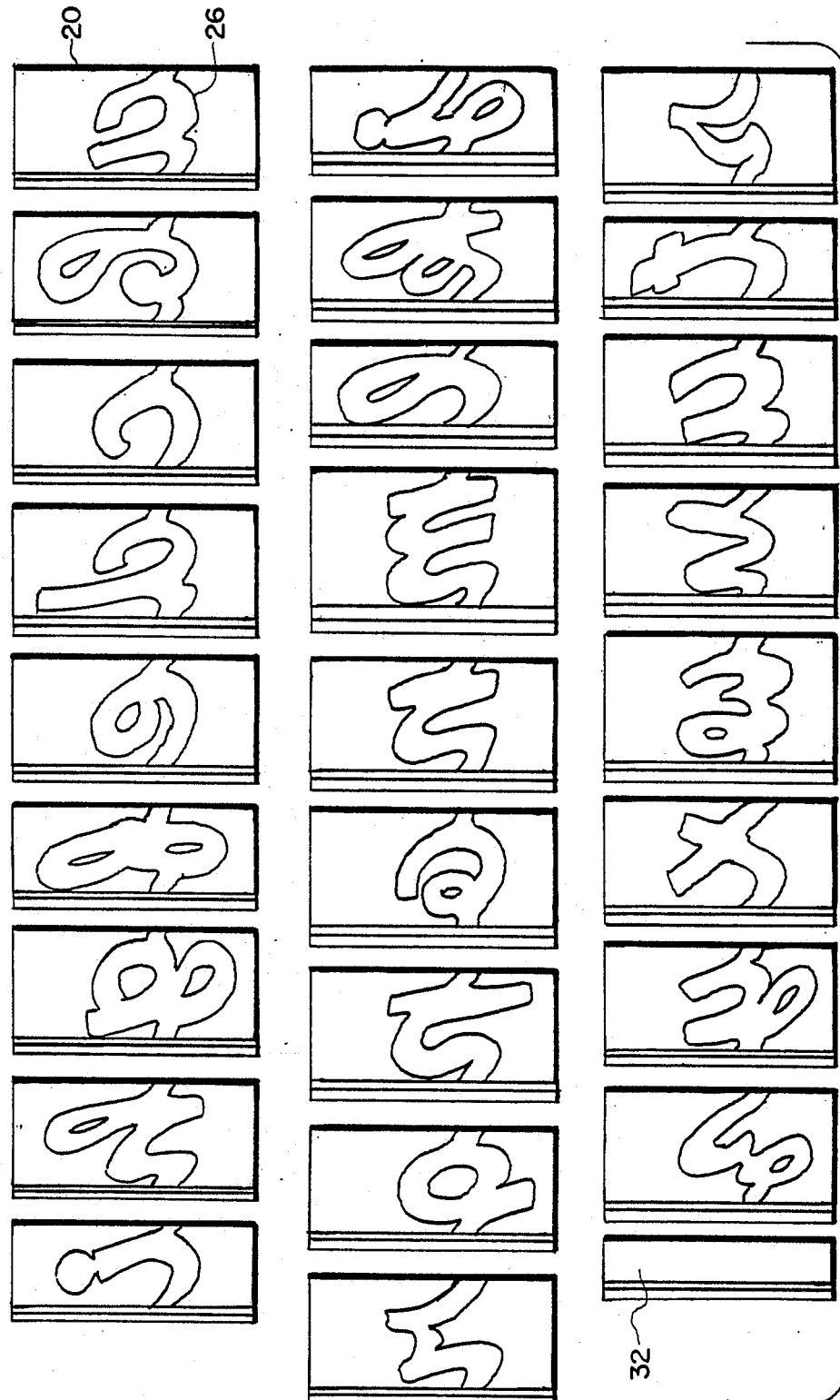
FIG. 2 is a plan view of the preferred embodiment illustrating the entire alphabet as viewed from the bottom of the body.
Figure 7:
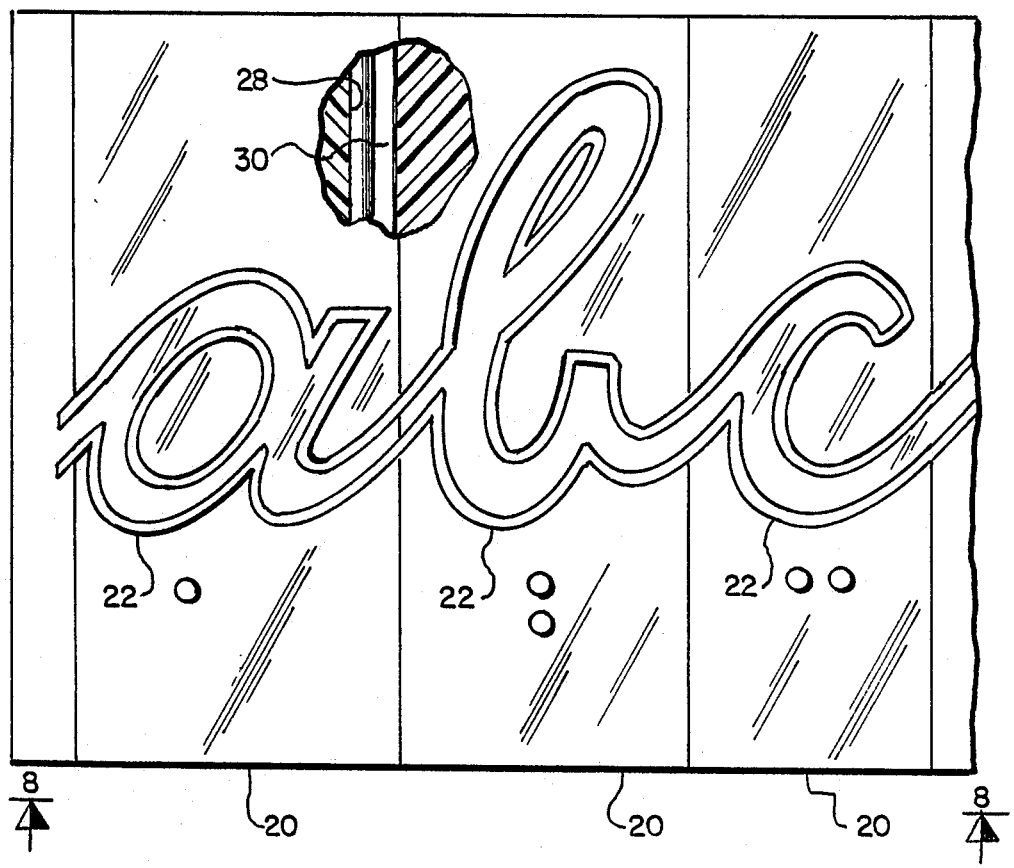
FIG. 7 is a plan view of the preferred embodiment with a plurality of cutters joined together partially cut-away for clarity.
Figure 8:
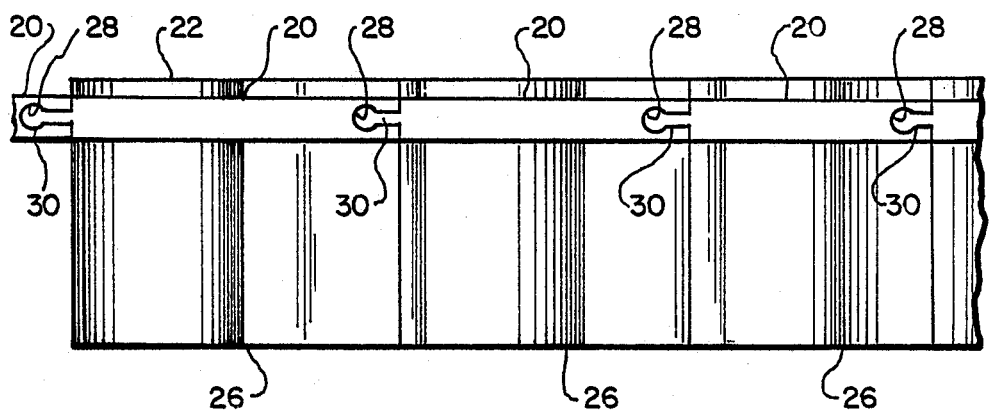
FIG. 8 is a cross-section view taken along lines 8—8 of FIG. 7.

In order to start and complete a word, the cutters are slipped together with the tongue and groove arrangement and a rectangular blank 32, shown in FIGS. 1 and 2, is utilized on each end. These blanks 32 are the same size as the cutter bodies 20 and have a tongue 30 or groove 28 on the appropriate side and a cut-off extended blade 26 the same length as that of the letters, except only the width of the letter where it interfaces at the side. This element allows the letter to be terminated at each end of the word completing the periphery of the word enabling the cutter to have a start and finish.

The second embodiment is identical in structure and function with the exception of the attaching means holding the cutter bodies 20 together. This embodiment is illustrated in FIGS. 9 through 13 and consists of a retaining frame 34 in "U" shape having an internal groove-like cavity on the inside. In this embodiment the cutter bodies 20 have a narrowed section 36 on the upper and lower edge that fits into the cavity on the frame 34. In use the bodies 20 are slipped in from the open end of the frame with a blank 32 first and last. A locking bar 38 completes the enclosure by interfacing with the frame 34 on the open end. The bar 38 contains a recess for a snap lock fastener 40 on the blank 32 that becomes the fastening means to hold the frame into the assembly. The detail of the snap lock fastener 40 is shown best in FIG. 12 in cross-section.

Figure 14:
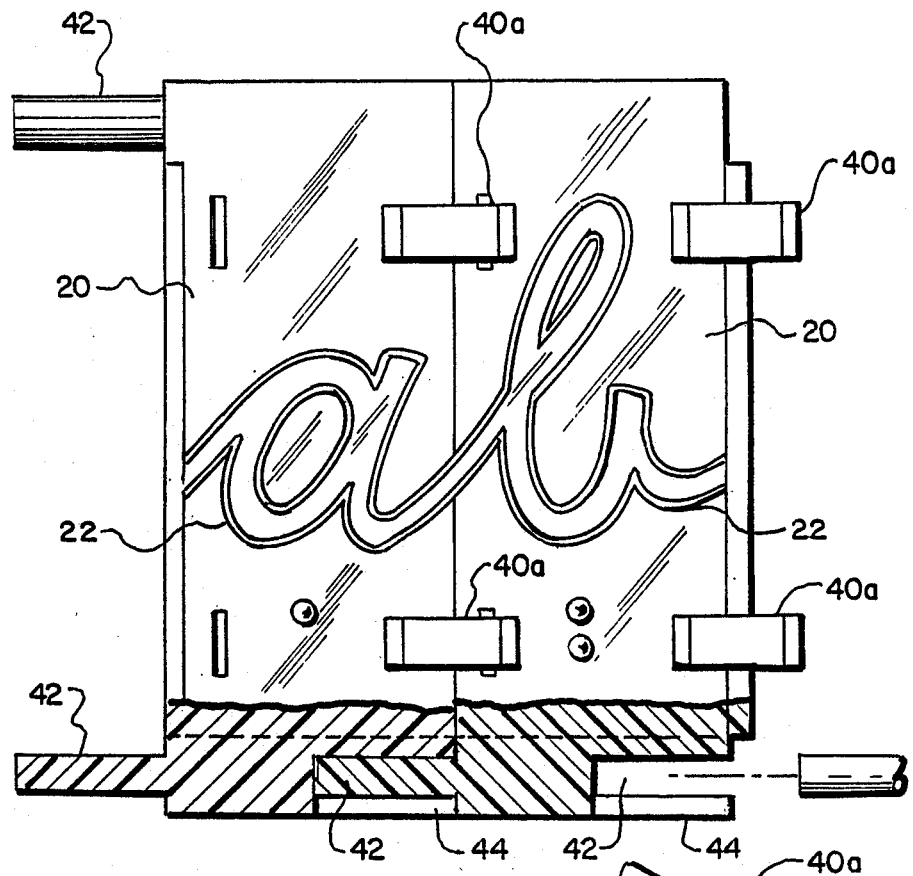
FIG. 14 is a plan view of the third embodiment, illustrating the integral pins and sockets.
Figure 15:
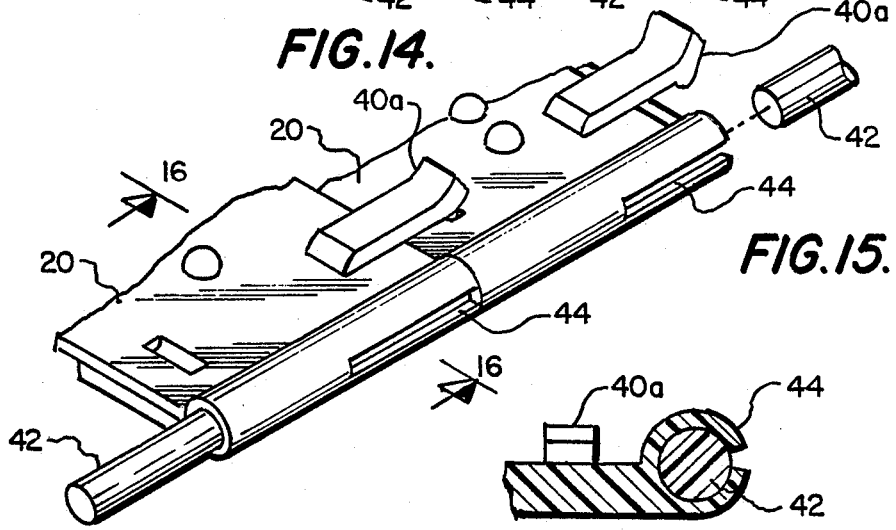
FIG. 15 is a partial isometric view of the third embodiment.
Figure 16:
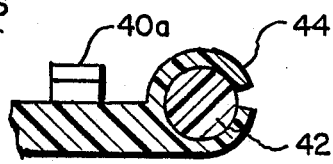
FIG. 16 is a cross-sectional view taken along lines 16—16 of FIG. 15.

The third embodiment is depicted in FIGS. 14 through 16 and again differs in only the method of fastening the rectangular cutter bodies 20 together. Each body 20 has both a pin 42 on the lower and upper edge distending from one side and a socket 44 on the other. The pin 42 and socket 44 are sized to mate with another body 20. Connecting means are utilized to hold the bodies 20 together consisting of a snap lock fastener 40a not unlike that employed in the second embodiment.

While the invention has been described in complete detail and pictorially shown in the accompanying drawings, it is not to be limited to such details, since many changes and modifications may be in the invention without departing from the spirit and the scope thereof. Hence, it is described to cover any and al modifications and forms which may come within the language and scope of the appended claims.

I claim:

1. A dough cutter having a plurality of individual cursive alphabetic letters attached together to form a continuous combination of letters comprising:
   (a) a plurality of rectangular cutter bodies each having a top surface, a bottom surface, an upper edge, a lower edge, a first side and a second side;
   (b) a raised individual cursive alphabet letter disposed integrally with said top surface completely filling the surface from the first side to the second side with the letter starting and ending at the same position on the sides relative to the lower edge;
   (c) a pair of extended cutting blades outwardly deployed from the bottom surface of said body in the form of a border of a cursive alphabet letter duplicating the raised individual letter on the top, except reversed in mirror image thereunto, said blade terminating with a sharp edge allowing dough to be cleanly cut when pressed thereunto; and,
   (d) attaching means to connect a plurality of bodies together to form a continuous combination of alphabetic letters allowing dough to be cut into a single piece with the blade mating on the sides outlining the letters.

2. The dough cutter as recited in claim 1 wherein said bodies further comprise; a thermoplastic material constructed of a substance having sufficient structural integrity to withstand the application of cutting pressure.

3. The dough cutter as recited in claim 1 wherein said bodies further comprise; a metallic material construction of a material having sufficient structural integrity to withstand the application of cutting pressure.

4. The dough cutter as recited in claim 1 wherein said individual cursive alphabet letters further comprise; a texturized surface on the raised portion allowing visual differentiation with the top surface and tactile comparison thereunto.

5. The dough cutter as recited in claim 1 wherein said attaching means to connect a plurality of cutter bodies together further comprise; each said body having a groove with a keyhole-like enlarged radial end along the entire first side and a tongue having a bulb-like enlarged radial end along the entire second side, the tongue and groove having a configuration such that when a pair of bodies are mated together the tongue slideably engages the groove when mated from either the upper or lower edge by a slip fit tight enough to hold the bodies together when a plurality of bodies are juxtapositioned together to form a continuous combination of letters.

6. The dough cutter as recited in claim 1 wherein said attaching means further comprise:
  (a) said cutter bodies having a narrowed section on the upper and lower edge;
  (b) a retaining frame in "U" shape having an internal groove-like cavity on the inside thereof, slightly larger than said narrowed section on the body sized to receive a plurality of bodies with said bodies slideably engaging the cavity in the frame when juxtapositioned together to form a continuous combination of letters; and,
  (c) a locking bar interfacing with said frame on each end further having fastening means to connect to said cutter body allowing the frame to retain the bodies together when cutting dough therewith.

7. The dough cutter as recited in claim 1 wherein said attaching means further comprise; said cutter bodies having a pin on one end of said lower and upper edges distending therefrom and having a socket on the other end of said lower and upper edge, sized as to mate with another body when juxtapositioned together to form a word, and connecting means on each body to hold the bodies together when cutting dough therewith.

8. A dough cutter having a plurality of individual cursive alphabetic letters attached together to form a continuous combination of letters comprising:
  (a) a plurality of rectangular cutter bodies each having a top surface, a bottom surface, an upper edge, a lower edge, a first side and a second side, said body also having a groove with a keyhole-like enlarged radial end along the entire first side and a tongue having a bulb-like enlarged radial end along the entire second side;
  (b) a raised individual cursive alphabet letter disposed integrally with said top surface completely filling the surface from the first side to the second side with the letter starting and ending at the same position on the sides relative to the lower edge; and,
  (c) an extended cutting blade outwardly deployed from the bottom surface of said body in the form of a border of a cursive alphabet letter duplicating the raised individual letter on the top, except reversed in mirror image thereunto, said blade terminating with a sharp edge allowing dough to be cleaning cut when pressed thereunto, the continuous combination of letters formed with selected cutter bodies having the appropriate letters being mated together slideably with the tongue mating with the groove by a slip fit tight enough to hold the bodies together when said bodies are juxtapositioned together to form the continuous combination of letters allowing dough to be cut into a single piece with the blade mating on the sides outlining the letters.

9. The dough cutter as recited in claim 8 wherein said bodies further comprise; a thermoplastic material construction of a substance having sufficient structural integrity to withstand the application of cutting pressure.

10. The dough cutter as recited in claim 8 wherein said cutter bodies further comprise; a metallic material construction of a material having sufficient structural integrity to withstand the application of cutting pressure.

11. The dough cutter as recited in claim 8 wherein said individual cursive alphabet letters further comprise; a texturized surface on the raised portion allowing visual differentiation with the top surface and tactile comparison thereunto.

12. A dough cutter having a plurality of individual cursive alphabetic letters attached together to form a continuous combination of letters comprising:
  (a) a plurality of rectangular cutter bodies each having a top surface, a bottom surface, an upper edge, a lower edge, a first side and a second side;
  (b) a raised individual cursive alphabet letter disposed integrally with said top surface completely filling the surface from the first side to the second side with the letter starting and ending at the same position on the sides relative to the lower edge;
  (c) an extended cutting blade outwardly deployed from the bottom surface of said body in the form of a border of a cursive alphabet letter duplicating the raised individual letter on the top, except reversed in mirror image thereunto, said blade terminating with a sharp edge allowing dough to be cleanly cut when pressed thereunto;
  (d) a raised individual braille sign corresponding to the individual cursive alphabet letter disposed integrally with said top surface near the lower edge such that the blind may recognize the cursive letter by touch; and,
  (e) attaching means to connect a plurality of cutter bodies together to form a continuous combination of alphabetic letters allowing dough to be cut into a single piece with the blade mating on the sides outlining the letters.

13. The dough cutter as recited in claim 12 wherein said bodies further comprise; a thermoplastic material construction of a material having sufficient structural integrity to withstand the application of cutting pressure.

14. The dough cutter as recited in claim 12 wherein said bodies further comprise; a metallic material construction of a material having sufficient structural integrity to withstand the application of cutting pressure.

15. The dough cutter as recited in claim 12 wherein said individual cursive alphabet letters further comprise; a texturized surface on the raised portion allowing visual differentiation with the top surface and tactile comparison thereunto.

* * * * *